Figure 4:
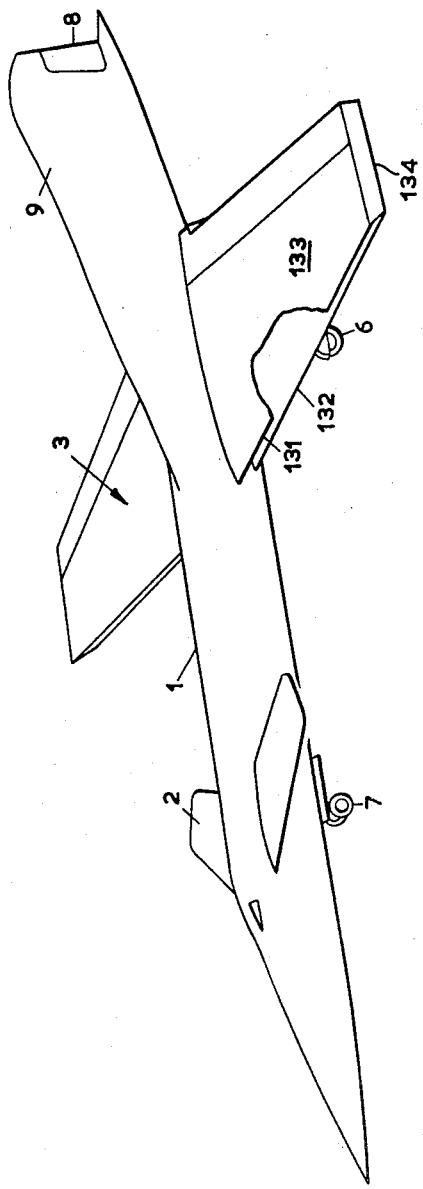

Oct. 18, 1960　　R. F. CREASEY ET AL　　2,956,759
AIRCRAFT WINGS INCORPORATING POWER INSTALLATION FOR PROPULSION
Filed Jan. 29, 1958　　　　　　　　　　　　　4 Sheets-Sheet 1
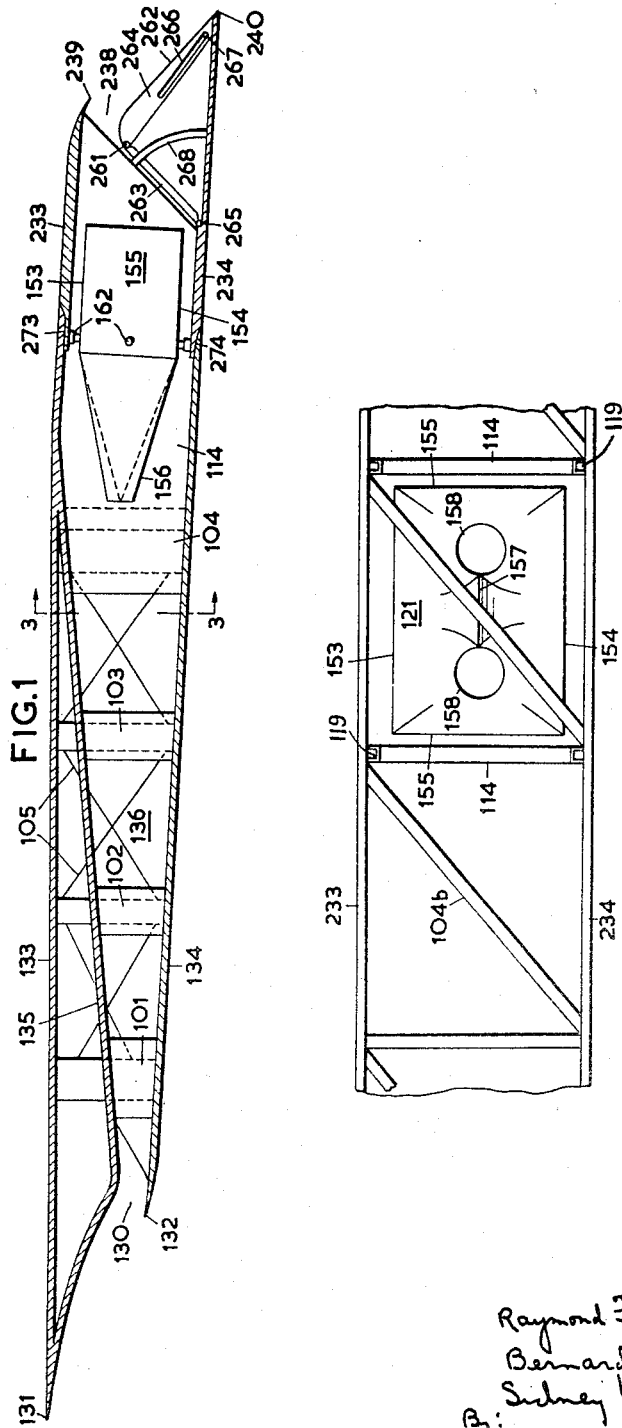
Inventors:
Raymond Frederick Creasey
Bernard Oliver Heath
Sidney Walmsley
By: Stevens, Davis, Miller & Mosher
Attorneys

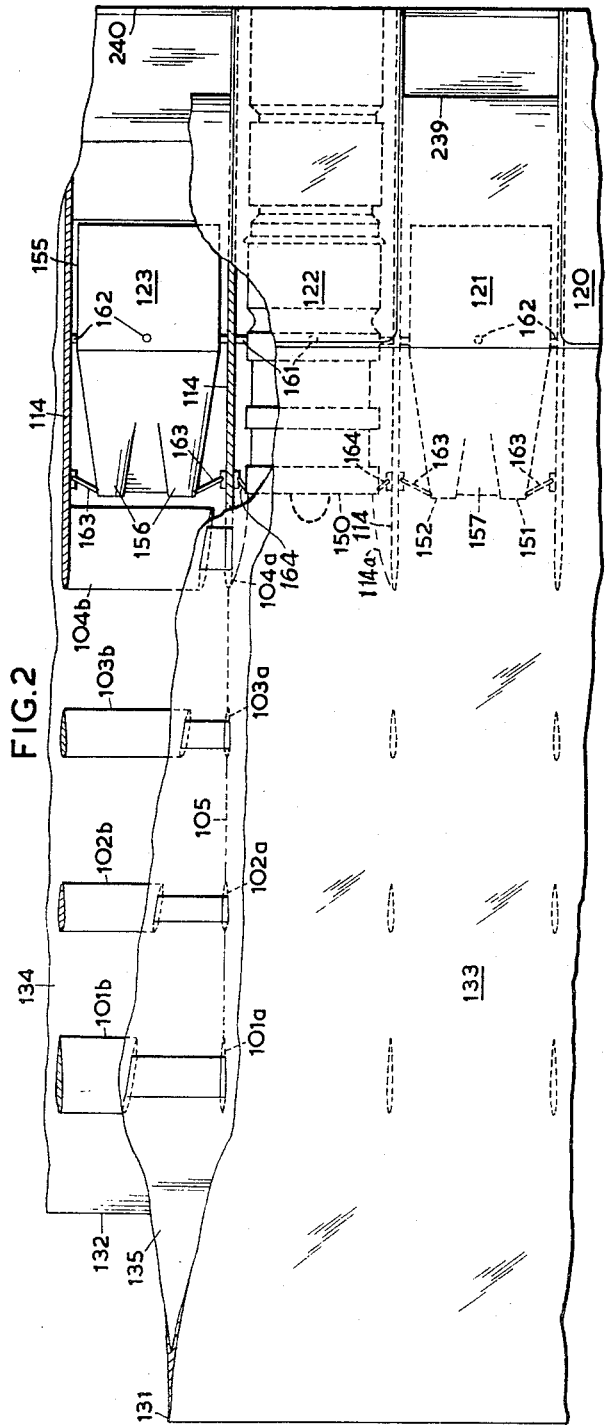

United States Patent Office 2,956,759
Patented Oct. 18, 1960

2,956,759

AIRCRAFT WINGS INCORPORATING POWER INSTALLATION FOR PROPULSION

Raymond Frederick Creasey, Lytham St. Annes, Bernard Oliver Heath, Lea, near Preston, and Sidney Walmsley, St. Annes, England, assignors to The English Electric Company Limited, London, England, a British company Filed Jan. 29, 1958, Ser. No. 712,041

Claims priority, application Great Britain Feb. 21, 1957

15 Claims. (Cl. 244—15)

The present invention relates to a modification of the aircraft wing incorporating in its interior a power installation for propulsion according to our United States patent application Serial No. 631,002, filed on December 27, 1956 by Bernard Oliver Heath et al., in which said wing and power installation are integrated with one another structurally, aerodynamically and thermodynamically into a structure guiding the flow of air over and through the said wing and of combustion products through the said wing, and carrying the aerodynamic and thermodynamic loads and thermal stresses arising therefrom.

According to the present invention the propulsive power installation comprises turbo-jet engines alternating with ram-jet engines, all these jet engines being disposed in the rear portion of the wing, the turbo-jet engines serving for accelerating the aircraft to cruising height and speed when the further propulsion is taken over by the ram-jet engines.

Thereby an improved operational flexibility is attained. However, as the air requirements of the turbo-jet engines and ram-jet engines vary throughout the flight, an appreciable redistribution of the air between the two-dimensional inlet and the turbo- and ram-jet engines causes cross flows inside the wing which do not permit the use of chordwise webs in the portion of the wing ahead of the air entry into the jet propulsion engines.

According to a preferred form of the present invention the wing is divided into a main structural portion forward of the air entries into the jet propulsion engines wherein the upper and lower wing panels are connected to one another by a number of discrete spanwise spars in the form of N-girders which allow cross flow in addition to the main chordwise flow of the air through the wing, and a rear portion carrying the jet propulsion engines in compartments separated by splitter plates perpendicular to the two wing panels and in alignment with the perpendicular struts of the said N-girders of the forward main structural portion of the wing.

These compartments house alternately turbo-jet engines and ram-jet engines. The number of ram-jet engines may exceed that of the turbo-jet engines.

Where the struts of the said N-girders pass through the internal air duct of the wing they are of streamlined section with small thickness-chord ratio. The latter applies also to the said splitter plates connecting the upper and lower wing panel with one another in the jet propulsion engine rear portion of the wing.

Distributed normal aerodynamic and inertia loads are carried by the said wing panels to transmit shear loads to the said spars and so to enable the wing to function as a beam. A cellular sandwich construction of these panels enables the same to carry in addition to the usual spanwise end loads also shear loads and bending moments spanwise, as well as lighter shear loads.

In the forward main portion of the wing the corrugations of the cellular sandwich construction preferably run in the spanwise direction. However in the jet propulsion engine rear portion the corrugations may alternatively be placed chordwise so as to allow a cooling air stream to flow through them in the chordwise direction.

The internal duct pressures are also carried by the said sandwich panels to chordwise rows of small ties which restrain the upper and lower wing panels from bursting. These ties are spaced as closely as the internal flow conditions in the wing duct permit, so that skin bending moments, distortions and creep buckling are kept at a minimum.

These ties may be placed more closely to one another chordwise than spanwise. Such an arrangement prevents high local bending moments in the wing panels and shear loads over the ties, and reduces aerodynamic losses in the internal wing duct by minimising the wake of the said ties.

The inner panel in the forward portion of the wing which forms the isentropic curve and the throat of the ram air entry and the divergent diffusor, is also of cellular construction, like the wing panels. Members diagonal to the chord capable of providing a chordwise shear connection are also arranged in said space between the said N-girders.

At the aft end of the diffusor where the chordwise bracing has to be located in the air duct itself, this bracing may be effected either by two pre-tensioned crossed diagonals or by one strut in order to reduce aerodynamic losses.

While the forward main structural portion of the wing is subject to stagnation temperatures as a maximum, the rear portion of the wing carrying the jet propulsion engines is subject to high temperatures owing to combustion within. Accordingly the main structure of the wing may be made of different materials than the engine carrying portion. For example the main structure may be made of stainless steel and/or titanium or titanium alloys, and the engine carrying portion of nickel alloy or other specially heat and creep resistant material.

Preferably the jet propulsion engine portion of the wing is connected structurally to the forward main portion of the wing only by the aforesaid splitter plates and by ram-jet engine compartment covers which carry the overhang loads from the engine portion to the forward main portion of the wing but allow a spanwise differential heat expansion of the two portions of the wing relative to one another, joints being provided for this purpose in the upper and lower wing panels at the juncture of the engine portion with the main wing structure. Temperatures vary also considerably spanwise between the comparatively cool compartments for the turbo-jet engines and the very much hotter compartments for the ram-jet engines.

Accordingly joints are provided between covers of the compartments for the turbo-jet engines and those for the ram-jet engines, allowing both spanwise and chordwise relative movements. The covers for the turbo-jet engines are loaded only by aerodynamic pressures, large internal bursting pressures being eliminated by sealing the compartment for the turbo-jet engine from the air duct at the entry into the engine, for example by means of bellows. Single skin panels with spanwise stiffeners may then be used as there is no internal airflow through these compartments. The external airflow provides cooling. The covers transfer their normal loads by so-called "simply supported" spanwise bending on to the splitter plates. Attachment of the said covers may be effected by elongated holes to provide for thermal expansion as described. Very few attachments are needed for the turbo-jet covers which may be made easily detachable for engine servicing.

The ram jet burners are enclosed in rectangular chordwise positioned compartments overhung rearwards from the main structure of the wing. Continuity of bending stiffness around these compartments, from the aforesaid vertical splitter plates forming the sides of the said compartments to the upper and lower panels thereof, is provided by chordwise positioned square tubes at each corner of the said compartments. These tubes also carry cooling air rearwards from the duct in the forward wing portion. This air may be tapped off, if desired, into the aforesaid spanwise corrugations which form the cores of the ram-jet engine covers and splitter plates.

The strength of the cover plates enables the vertical splitter plates to transfer all the shear forces resulting from overhang forward by chordwise bending through the aforesaid spanwise expansion joint, so as to be finally reacted as wing torsion in the forward main wing portion, together with spar shear transferred through the aforesaid chordwise bracing from the splitter plates.

Figure 5:
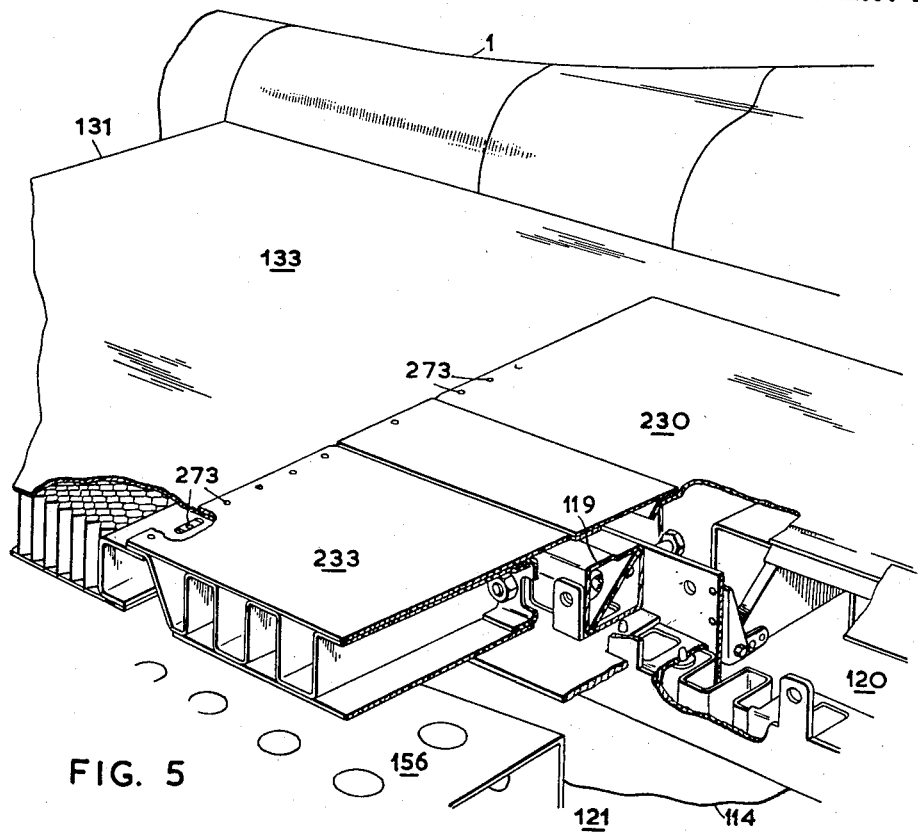
Figure 6:
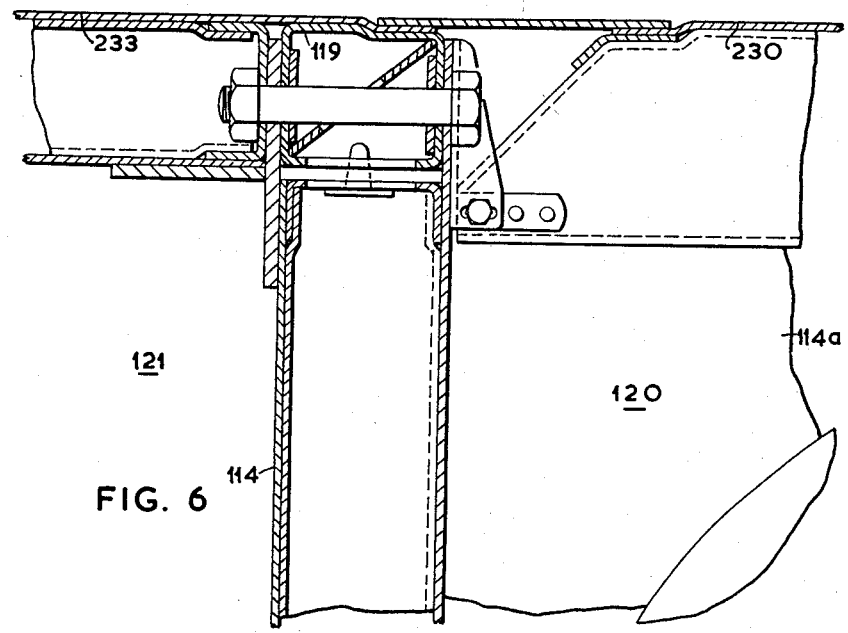

In order that the invention may be clearly understood, and readily carried into effect an embodiment thereof will now be described with reference to the accompanying drawings, in which:

Fig. 1 is a chordwise section through the wing,
Fig. 2 is a plan view, and
Fig. 3 is a section along line 3—3 of Fig. 1 on a larger scale, of part of the wing.
Fig. 4 shows in a perspective view, partly broken off, a general arrangement of an aircraft embodying the present invention, on a smaller scale.
Fig. 5 is a perspective part view, partly broken off, showing the connection of the two wing portions to one another, and
Fig. 6 is a spanwise section of a detail of the said connection.

Referring firstly to the general arrangement (Fig. 5) the aircraft fuselage has an all-moving foreplane 2 and a main wing denoted 3 as a whole, and carries at its rear end a fin 9 and rudder 8. It is supported on the ground by a main undercarriage 6 and nose wheel arrangement 7.

The main structural portion of the wing consists of the straight upper wing panel 133 having a projecting leading edge 131, the lower wing panel 134 having a cambered leading edge or lip 132, and an inner panel 135 merged at its leading edge with the leading edge 131 of the upper wing panel 133, then forming consecutively an isentropic curve and a throat 130 with the leading edge portion of the lower wing panel 134, said isentropic curve and throat forming a ram air entry into the interior of the wing. The said inner panel 135 then forms a divergent diffusor 136 with the lower wing panel 134 and eventually merges with the upper wing panel 133.

The upper and lower wing panels 133, 134 and the inner panel 135 are of cellular construction. The upper wing panel 133 and lower wing panel 134 are structurally connected to one another by a number, say four, N-girders 101, 102, 103, 104 placed at different chordwise stations of the wing, each consisting of struts 101a, 102a, 103a, 104a substantially perpendicular to the wing chord datum, and spanwise inclined struts 101b, 102b, 103b, 104b. The struts of the three forward N-girders 101, 102, 103 penetrate through the innerpanel 135 and are of a streamlined section with small thickness-chord ratio at least within the throat 130 and divergent diffusor 136. The last N-girder 104 lies entirely within the diffusor 136, and its struts are profiled as a whole in the manner described.

Thin streamlined wires 105 running as crossed diagonals between the tops and bottoms of the consecutive N-girders provide tension connections between the upper and lower wing panels 133, 134, and give chordwise shear stiffness.

The perpendicular struts 104a of the N-girder 104 are continued aft in the form of splitter plates 114 structurally connecting the rear parts of the upper and lower wing panels 133, 134 with one another and overhung aft of the same in a manner explained later. These webs or splitter plates 114 which are also of cellular sandwich construction divide the wing spanwise into a number of rectangular compartments 120, 121, 122. . . .

The compartments 120, 122 . . . each contain a turbo-jet engine 150 the air entry of which is sealed at 114a against the upper and lower wing panels 133, 134 and the adjacent webs 114, for example by bellows, so that the ducts left between the circular circumference of the turbo-jet engines and the rectangular compartments are relieved of the ram air pressure augmented by the divergent diffusor 136.

Each turbo-jet engine 150 is supported near its centre of gravity by means of two horizontal and two vertical spigots 161 fitted slidably in their axial directions into bushes positioned on the wing panels 133, 134 and splitter plates 114, respectively. Thus the engines are free to expand radially, and the loads and moments in all the three spatial directions may be taken directly into the appropriate structural member.

Near its front end each turbo-jet engine is attached to the splitter plates 114 by swivelling links 164 steadying the same and providing additional stiffness under vertical loads and pitching moments in the main wing flutter modes. These links are capable of taking up lateral and axial differential expansions.

Access panels 230 to the engines 150 are to be arranged aft of the said spigots 161. These access panels 230 may be light, easily detachable covers since the sealing of the turbo-jet entries against the compartments 120, 122 reduces the pressure loads therein, and no stiff box construction is therefore required for the compartments of the turbo-jet engines 150.

The compartments 121, 123 . . . alternating with the aforesaid compartments 120, 122 . . . for the turbo-jet engines enclose ram-jet engines 156, the burners of which (not shown) are arranged side by side in casings having round inlet orifices 158 for the primary air at the narrow ends connected by horizontal splitter plates 157 of truncated cones 151, 152 merging at their wide ends with a rectangular casing having a top wall 153, a bottom wall 154 and side walls 155. These walls 153, 154, 155 are spaced from the adjacent wing panels 233, 234 and splitter plates 114 respectively so that by-pass ducts are formed around the ram jet engine casing through which secondary air may pass which at the same time serves for cooling the said wing panels and splitter plates.

Similar to the turbo-jet engines the ram-jet engine casings 156 are attached near their centres of gravity by vertical and horizontal spigots 162 to the rear ends of the main panels 133, 134 and to the splitter plates 114, respectively, and are steadied by swivelling links 163, articulating their forward ends to the said splitter plates 114. These splitter plates begin just in front of the inlet orifices 158 of the ram-jet engines 156 and run right to the trailing edge 239 of the rear wing portion to be described later in more detail.

These splitter plates 114 and wing panels 233, 234 form stiff boxes round the compartments 121, 123 . . . which resist the bursting pressure of the ram-jet exhaust.

Square tubes 119 chordwise arranged in every corner of a compartment 121, 123 . . . fixedly attached, for example welded to the vertical splitter plates 114 give continuity of bending stiffness from the vertical splitter plates 114 to the upper and lower wing panels 233, 234 of the ram jet enclosing portion of the wing. These square tubes 119 could be formed by the intersection of splitter plates and wing panels. They may also carry cooling air rearward from the internal air duct of the wing. Removable inspection panels for the compartments 121, 123 . . . are constructed as load carrying elements and attached to the adjacent structure in a manner capable of transmitting these loads.

As in the embodiments described in the previous patent specification the trailing edge 239 of the upper wing panel 233 is curved down in the ram-jet sections and forms a throat 238 of a jet nozzle with a humped metal sheet 262 attached to the lower wing panel 234 of the ram jet carrying portion of the wing. The metal sheet 262 is supported by two links 263, 264 articulated to one another at 261. The link 263 is articulated on the lower wing panel at 265, and the link 264 has a slot 266 engaging a pin 267 allowing the said link to slide rearwardly and downwardly beyond the trailing edge 240 of the lower wing panel 234, whereby the width of the throat 238 can be adjusted.

An arc 268 braces the trailing edge portion of the lower panel 234 against the trailing edge portion of the splitter plates 114, which slope forward and downward from the trailing edge 239 of the upper wing panel 233.

Joints 273, 274 are arranged between the upper wing panels 133, 233 and the lower wing panels 134, 234, respectively allowing free spanwise relative movement between them as required by differential thermal expansion.

What we claim as our invention and desire to secure by Letters Patent is:

1. An aircraft wing comprising in combination a forward main structural wing portion having an upper and a lower lift producing panel, a supersonic shock wave air intake arranged between the said panels at the leading edges thereof and a divergent diffuser joining the said air intake aft of it in the chordwise direction, load carrying members structurally, aerodynamically and thermodynamically integrating the said panels, air intake and diffusor into a rigid unit guiding the air over and through the said forward wing portion carrying all the aerodynamic and thermodynamic loads and thermal stresses arising therefrom, and a rear wing portion comprising an upper and a lower lift producing panel, chordwise disposed splitter plates structurally connecting the said lift producing panels of the said rear wing portion and dividing the latter into separate compartments alternating turbo-jet engines and ram-jet engines housed in the said compartments, and a jet nozzle discharging a sheet of jets from the said jet engines at the trailing edge of the said rear portion, the said rear wing portion while carrying its own aerodynamic and thermodynamic loads and thermal stresses as a self-contained structural unit being attached cantilever fashion to the said forward portion so as to transmit overhang loads to the same while allowing differential thermal expansion in the spanwise direction.

2. An aircraft wing as claimed in claim 1, wherein the number of the said ram-jet engines exceeds that of the said turbo-jet engines.

3. An aircraft wing as claimed in claim 1, wherein the said forward main structural wing portion is internally open spanwise allowing cross flow in addition to the main chordwise flow through the said wing portion.

4. An aircraft wing as claimed in claim 1, wherein the said load carrying members of the forward main structural wing portion comprise discrete spanwise spars having struts in the form of N-girders.

5. An aircraft wing as claimed in claim 4, wherein the struts of the said N-girders are in chordwise alignment with one another and with the said splitter plates of the said rear wing portion.

6. An aircraft wing as claimed in claim 4, comprising in addition the said load carrying members, ties connecting the said upper and lower wing panels of the said forward wing portion and restraining the same from bursting under internal duct pressures.

7. An aircraft wing as claimed in claim 4, comprising in addition the said load carrying members, ties arranged in chordwise rows spaced spanwise from one another, connecting the said upper and lower wing panels of the said forward wing portion and restraining the same from bursting under internal duct pressures, the chordwise spacing of said ties in each row being closer than the spanwise spacing of the said rows from one another.

8. An aircraft wing as claimed in claim 4, comprising in addition the said load carrying members, shear connection members disposed diagonally to the chord between consecutive N-girders in the said forward main portion of the wing.

9. An aircraft wing as claimed in claim 8, wherein the said shear connection members located in the said diffuser of the said forward wing portion are disposed as pre-tensioned cross diagonals.

10. An aircraft wing as claimed in claim 8, wherein the said shear connection members located in the said diffuser of the said forward wing portion are constituted as single struts.

11. An aircraft wing comprising in combination a forward main structural wing portion having an upper and a lower lift producing panel, a supersonic shock-wave air intake arranged between the said panels at the leading edges thereof and a divergent diffusor joining said air intake aft of it in the chordwise direction, load carrying members structurally, aerodynamically and thermodynamically integrating the said panels, air intake and diffusor into a rigid unit guiding the air over and through the said forward wing portion carrying all the aerodynamic and thermodynamic loads and thermal stresses arising therefrom, and a rear wing portion comprising an upper and a lower lift producing panel, chordwise disposed splitter plates structurally connecting the said lift producing panels of the said rear wing portion and dividing the latter into separate compartments, alternating turbo-jet engines and ram-jet engines housed in the said compartments, and a jet nozzle discharging a sheet of jets from the trailing edge of the said rear portion, the said panels of the rear wing portion comprising covers of the said ram-jet engine compartments carrying and transmitting loads of the said rear wing portion and covers of the said turbo-jet engine compartments carrying local loads only, joints connecting the said splitter plates and covers of the jet-engine compartments to the said forward wing portion transmitting overhang loads from the said rear wing portion to the said forward wing portion while permitting spanwise differential thermal expansion thereof, the said rear wing portion otherwise forming a self-contained integral structure carrying its own aerodynamic and thermodynamic loads and thermal stresses.

12. An aircraft wing as claimed in claim 11, comprising joints between the said covers of the compartments for the turbo-jet engines and of the compartments for the ram-jet engines allowing both spanwise and chordwise differential thermal expansions thereof.

13. An aircraft wing as claimed in claim 11, comprising sealing means sealing the said compartments for the turbo-jet engines from the air duct in the said forward wing portion so as to relieve the said turbo-jet engine compartments from internal bursting pressures.

14. An aircraft wing according to claim 11, comprising chordwise square tubes provided at each corner of the said jet-engine compartments fixedly attached to said splitter plates and providing for continuity of bending stiffness around each compartment from the said splitter plates to the said upper and lower panels of the said rear wing portion.

15. An aircraft wing according to claim 14, wherein the said tubes are in communication with the air duct in the said forward wing portion carrying cooling air rearwardly therefrom.

References Cited in the file of this patent

UNITED STATES PATENTS

| | | |
|---|---|---|
| 2,684,817 | Roy | July 27, 1954 |
| 2,820,599 | Ackeret et al. | Jan. 21, 1958 |
| 2,836,379 | Salmon | May 27, 1958 |

FOREIGN PATENTS

| | | |
|---|---|---|
| 297,720 | Italy | June 23, 1932 |